Aug. 14, 1928.  
H. F. KING  
LIGHT PROJECTOR  
Filed April 27, 1925      2 Sheets-Sheet 2

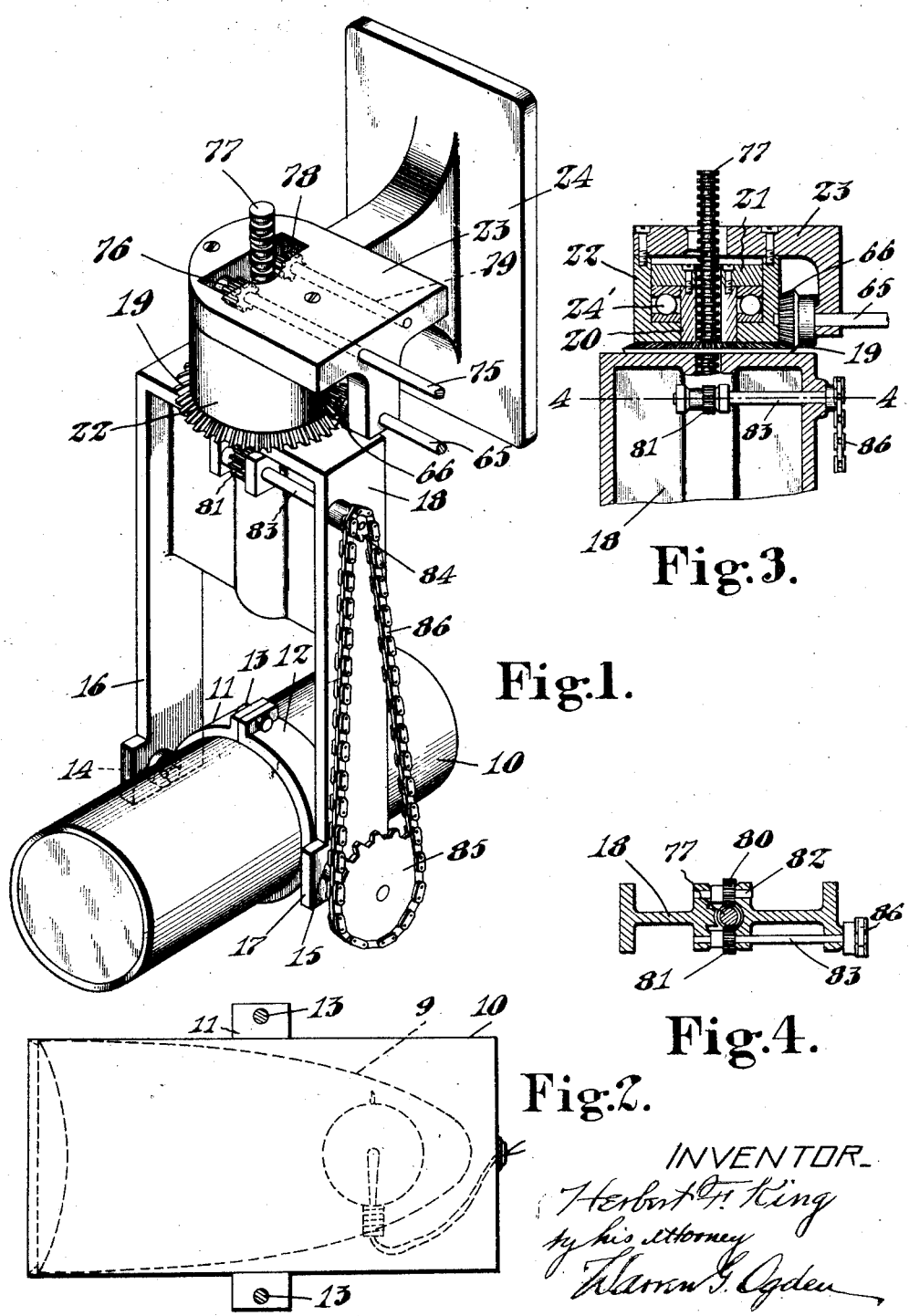

1,680,685

INVENTOR.  
Herbert F. King  
by his attorney  
Warren G. Ogden

Patented Aug. 14, 1928.

1,680,685

UNITED STATES PATENT OFFICE.

HERBERT F. KING, OF NEWTONVILLE, MASSACHUSETTS.

LIGHT PROJECTOR.

Application filed April 27, 1925. Serial No. 26,314.

The present invention relates, generically, to automatic light projectors such, for instance, as illuminators or spot-lights which project a stream of light beams, and picture machines which project images of objects on a screen. Specifically, the invention relates to automatic spot-lights, but it must be understood that this specific embodiment has been selected for its convenience in disclosing the broad invention and not with any intention to limit the scope of the invention thereto.

The principal object of the invention is to produce a light projector which may be moved automatically to cause the stream of light beams to move through a predetermined path and spot successively a plurality of objects and hold the spot for an interval on at least one of said objects.

To the accomplishment of this object, a feature of the invention contemplates the provision in an apparatus of the generic class described, of a light projector, automatic mechanism for turning the light projector about an axis to shift the position of the stream of light, and means for controlling said mechanism to cause the stream of light to move through a predetermined path and spot successively a plurality of objects and hold the spot for an interval on at least one of said objects.

Broadly considered the light projector may be turned about an axis in any plane but it is better to turn the light projector either about a vertical or a horizontal axis, and best to turn the light projector about both vertical and horizontal axes, or at least about normal intersecting axes, so that the stream of light is shifted along a resultant path thus increasing its field of movement.

In the broader aspects of the invention the direction and extent of the turning movement or movements imparted to the light projector may be derived from a cam mechanism, but in order that the path of the stream of light or the interval in which the spot of light is held on at least one object in the path, or both the path and the interval may be changed readily it is preferred to employ a variable pattern instead of a cam mechanism.

Other features of the invention relate to certain devices, combinations and arrangements of parts fully set forth hereinafter, the advantages of which will be readily understood by those skilled in the art.

The various features of the present invention will be best understood from an inspection of the accompanying drawings illustrating an explanatory embodiment of the invention, in which, Figure 1 is a perspective of an automatic light projector;

Fig. 2 is a vertical section through the case of a spotlight selected as the specific light projector for the purpose of disclosure only;

Fig. 3 is a detail in sectional elevation of the mechanism for tipping the spot-light in a vertical plane about a horizontal axis and for rotating the spot-light in a horizontal plane about a vertical axis;

Fig. 4 is a sectional plan on the line 4—4, Fig. 3;

Figures 5, 7:
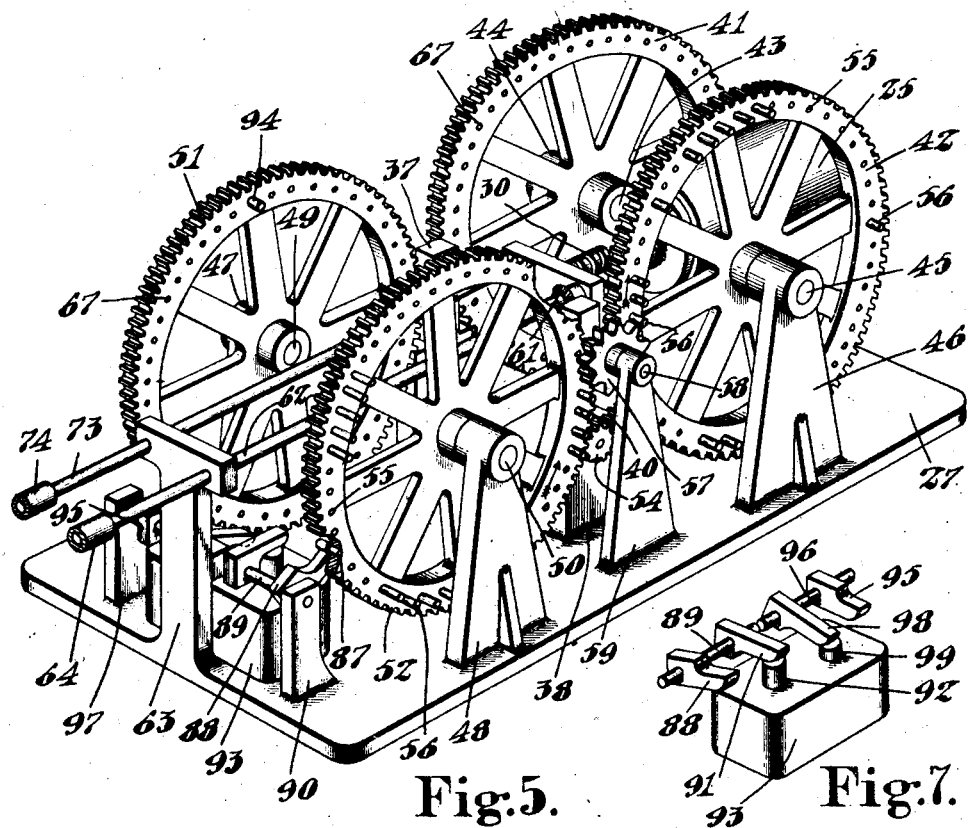
Fig. 5 is a perspective of the mechanism for controlling the direction and extent of the tipping and rotating movements imparted to the spot-light.
Fig. 7 is a detail in perspective showing the switch connections for lighting or darkening the show window.

Describing the specific embodiment of the invention in general terms the spot-light is mounted, centrally over the street window of a store display or show room, to move about two normal intersecting axes, or about two axes intersecting at right angles to each other, and thus project its stream of light on any spot within the darkened show room except on the street window thereof. Mechanism is provided for turning the spot-light on the two axes referred to and the direction and extent of these turning movements is controlled by a pattern mechanism in order that the stream of light may pick out in a successive or predetermined manner the various articles or objects exhibited in the show room and hold the spot on at least one of said objects for an interval. At the end of each cycle of movement of the stream of light, means controlled by the pattern mechanism lights the show window for a predetermined period and then darkens the show room again preparatory to another cycle of movement of the stream of light.

Supposing that the show window is dressed to display the furniture and decorations of a living room furnished with various chairs, tables, lamps, sofas, a clock, a talking machine, a radio, etc., the pattern mechanism would be arranged in an arbitrary manner to cause the stream of light to spot the various objects in the darkened show window successively or in accordance with some preconceived plan and hold the spot on at least one of said objects for an interval. The stream of light first might pick out the clock, then move to spot the radio, then a chair, or a lamp, returning to the clock before spotting other objects, or completing a successive spotting of each object in the show window. The spot may be held for an interval on any or all of the objects. The phrase "hold the spot" is considered broad enough, and is herein intended, to include the moving of the spot vertically or laterally over objects elongated vertically and horizontally, respectively. After completing the cycle the whole show window is flooded with light by means other than the spot light to display its entire contents. After a time the show window is again darkened and the spot-light, which has remained stationary and unlighted, if desired, during the lighting of the whole show window, is again actuated to move its projected stream of light through its cycle.

The spot-light 9 (Fig. 2) is mounted in a cylindrical case 10 which is held in a band comprising a pair of semi-circular straps 11 and 12 secured together by bolts 13. The straps 11 and 12 are provided with trunnions 14 and 15 (Fig. 1) which are mounted to turn freely in the depending plates 16 and 17 of a frame or turret 18. Secured to the top of the turret 18 is a large bevel gear 19 carrying a tube 20 (Fig. 3) to which a cap 21 having a central opening is secured. The tube 20 and cap 21 rotate in a cylindrical chamber 22 secured to a cover plate 23 carried by a wall bracket 24 arranged to be secured in some convenient position in a show room preferably centrally above the street window thereof. To facilitate the rotation of the cap 21 and to provide a thrust bearing for the turret 18 and the parts carried thereby, a ball race 24' is interposed between the cap 21 and the bottom of the chamber 22.

With this construction, by rotating the turret on the ball race the spot-light 9 may be rotated in a horizontal plane about the axis of the tube 20 and, by mechanism to be described later, the spot-light may be tipped in a vertical plane relatively to the turret about the axis of the two trunnions 14 and 15. These two axes intersect at right angles to each other, or normal to each other, at a point located in the longitudinal axis of the spot-light 9. The spot-light is thus free to turn universally relatively to the wall bracket 24 and spot any object within the display room. In the specific embodiment of the invention it is not desirable to spot the street window of the show room and consequently there is no need of tipping or rotating the spot-light through an angle greater than 180°. It must be understood, however, that in its broader aspects the invention is not limited to any special angle through which the spot-light may be tipped or swung.

In order to tip and rotate the spot-light in either direction and to the desired extent a controlling mechanism is provided which may be located, if desired, out of the show room at a distance from the spot-light and connected thereto by flexible or other shafting. To this end an electric motor 25 (Figs. 6 and 8), is mounted on a bracket 26 on a base 27. The out-board end of the armature shaft 28, which rotates in a bearing supported by a bracket 29 on the base 27, carries a worm 30. The worm 30 meshes with a worm wheel 31 secured to a short shaft 32 journaled at one end in the bracket 29 and at its other end in a bracket 33 on the base 27. The shaft 32 carries a pinion 34 which meshes with a gear wheel 35 mounted on a long shaft 36 journaled near its opposite ends in brackets 37 and 38 rising from the base 27. On its ends the shaft 36 carries a pair of pinions 39 and 40 which mesh, respectively, with a pair of disks or gear wheels 41 and 42 (Fig. 5). The disk 41 is mounted on a stub shaft 43 journaled in a bracket 44 rising from the base 27. The disk 42 is also mounted on a stub shaft 45 journaled in a bracket 46 on the base 27. The base 27 also carries a pair of brackets 47 and 48 which support stub shafts 49 and 50 upon which are mounted disks or gear wheels 51 and 52. The disks 51 and 52 are rotated simultaneously with the disks 41 and 42, but in opposite directions thereto, by idler pinions 53 and 54, carried by stud shafts journaled in the brackets 37 and 38, and engaged, respectively, with the pinions 39 and 40.

The peripheral outside end faces of the disks 41, 42, 51 and 52 carry a series of holes 55 each adapted to receive a pin 56. The pins 56 on the wheels 42 and 52 are arranged to engage and rotate a pin wheel 57 mounted on a shaft 58 journaled in brackets 59, on the base 27, one of which is shown in Fig. 5. The shaft 58 carries a bevel gear 60 which engages a similar gear 61 on one end of a shaft 62 journaled at one end in the bracket 29 and at its other end in a bracket 63 (Fig. 5). Secured to the free end of the shaft 62 is one end of a flexible shaft 64, or its equivalent, which is connected at its other end to a short shaft 65 (Fig. 1) journaled in the cover plate 23. The shaft 65 carries a bevel gear 66 which meshes with the bevel gear 19.

When a pin 56 on either of the disks 42 and 52 engages the pin wheel 57 the bevel gear 19 is actuated, through the connections described, to rotate the turret 18. If the pin wheel 57 is engaged by a pin 56 on the wheel 42 the turret 18 is rotated in one direction. If the pin 56 engaged with the pin wheel 57 is on the disk 52 then the turret 18 is rotated in the other direction. The extent of rotation of the turret 18 in either direction is controlled by the number of pins 56 on one of the disks that engage the pin wheel successively. The duration of time between successive rotative movements of the turret is controlled by the spacing arrangement between successive actuating pins.

Figures 6, 8:
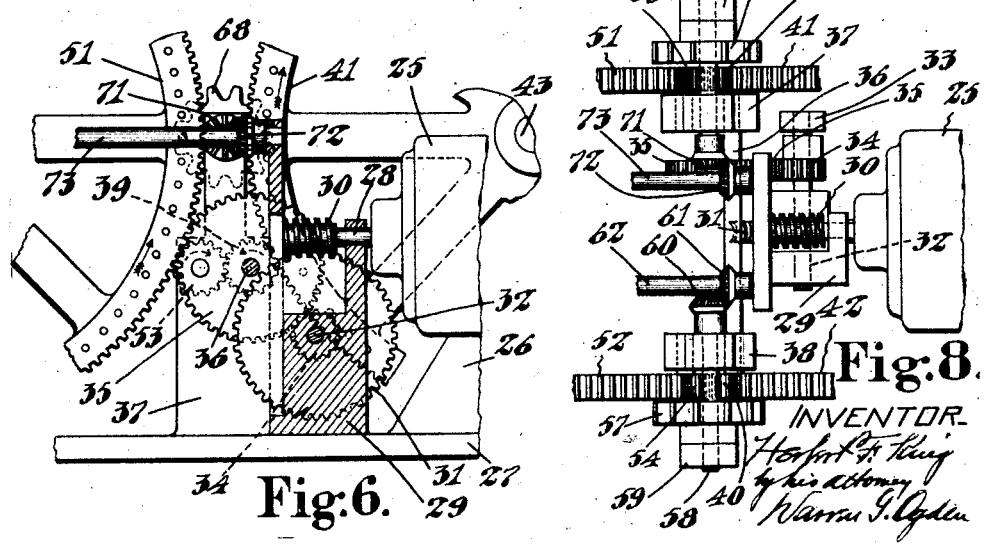
Fig. 6 is a detail in elevation showing the drive for the controlling mechanism.
Fig. 8 is a detail in plan showing both the controlling mechanism and its drive.

In order to tip the spot-light about its vertical axis the disks 41 and 51 are provided on their outside peripheral end faces with a series of holes 67 each of which is adapted to receive a pin similar to the pin 56 and arranged to engage a pin wheel 68 (Fig. 6). The pin wheel 68 is mounted on a shaft 69 journaled at one end in a bracket 70 and at its other end in the bracket 37. The shaft 69 carries a bevel gear 71 which meshes with a bevel gear 72 on a shaft 73 journaled at one end in the bracket 29 and at its other end in the bracket 63. At its free end the shaft 73 is connected to one end of a flexible shaft 74, or its equivalent, the other end of which is connected to a shaft 75 (Fig. 1) journaled in the cover plate 23. The shaft 75 carries a pinion 76 which meshes with a cylindrical rack 77 mounted to reciprocate within the tube 20 (Fig. 3), and through openings formed in the cover plate 23, the bevel gear 19, and the frame 18. The cylindrical rack 77 is also engaged by a thrust idler pinion 78 mounted on a stub shaft 79 journaled in the cover plate 23. Below the top of the frame 18 the cylindrical rack 77 engages a thrust idler pinion 80 and a driven pinion 81 (Fig. 4). The idler pinion 80 is mounted on a stub shaft 82 journaled at its opposite ends in the frame 18. The driven pinion 81 is mounted on a shaft 83 journaled in the frame 18. Outside the frame 18 the shaft 83 is provided with a sprocket 84 in order to transmit the rotary movements of the shaft 83 to a sprocket wheel 85, secured to an extension of the trunnion 15, through a chain 86.

When a pin 56 on either of the disks 41 and 51 engages the pin wheel 68 the cylindrical rack 77 is reciprocated, through the connections described, to drive the chain 86 and thus tip the spot-light in a vertical plane about a horizontal axis. The direction in which the spot-light tips is determined by the disk 41 or 51 which carries the pin 56 engaged with the pin wheel 68. If the pin 56 is on the disk 41 the spot-light is tipped in one direction. The spot-light is tipped in the other direction when the actuating pin is on the disk 51. The period of dwell between tipping movements and the extent of the tipping movements in either direction is determined by the spacing of the pins 56 on the disks 41 and 51. By providing mechanism for tipping and rotating the spot-light about two normal intersecting axes and by providing a pattern mechanism for controlling the period of dwell and the direction and extent of the tipping and rotating movements the spot-light may be actuated to spot singly in accordance with any arbitrary plan the objects displayed in the show window. The cycle of movement of the stream of light may be readily changed by shifting the arrangement of the pins on the pin disks.

In order to flood the show room with light on the completion of the spot-light's cycle the inside peripheral end face of the gear wheel 52 carries a pin 87 (Fig. 5) arranged to engage a dog 88 (Fig. 7) carried by a shaft 89 journaled in brackets 90, one of which is shown in Fig. 5. The shaft 89 also carries an arm 91 arranged to engage a lighting button 92 or other switch-actuating member on a switch box 93 carried by the base 27. The lighting button 92 controls the usual lighting arrangement of a show window and when pressed by the arm 91 turns on the show window lights, thus displaying its entire contents. The lighting button 92 may be connected to the switch for the spot-light so that when the show window lights are turned on the spot-light is turned off.

In order to redarken the show window a pin 94 (Fig. 5) on the inside peripheral end face of the disk 51 engages a dog 95 (Fig. 7) on a shaft 96 journaled in brackets 97 one of which is shown in Fig. 5. The shaft 96 carries an arm 98 arranged to engage the darkening button 99 or other switch-actuating member.

The spot-light switch may be actuated simultaneously with the actuation of the darkening button 99 to relight the spot-light when the show room is darkened and the spot-light cycle may be recommenced. The show window, however, may be left in darkness for a period of time before the spot-light is again relighted and restarted on its cycle.

Nothing herein contained is to be interpreted as limiting the invention in the scope of its application to use in connection with the particular apparatus or the particular mode of operation or both selected for purposes of illustration and explanation. While the particulars of construction herein set forth are well suited to one mechanical form of the invention, it is not limited to these details of construction, nor to the conjoint use of all its features, nor is it to be understood that these particulars are essential since they may be variously modified within the skill of the artisan without departing from the true scope of the actual invention, characterizing features of which are set forth in the following claims by the intentional use of generic terms and expressions inclusive of various modifications.

What is claimed as new, is:

1. An apparatus of the class described having, in combination, a light projector, mechanism for tipping and rotating the light projector, and patterns for actuating said mechanism and for variably controlling the direction and extent of the tipping and rotating movements.

2. An apparatus of the class described having, in combination, a light projector, mechanism for tipping the light projector and means for actuating said mechanism and for controlling the direction and extent of the tipping movement including a pin wheel and a pair of disks provided with a plurality of pins for rotating the pin wheel.

3. An apparatus of the class described having, in combination, a light projector, mechanism for rotating the light projector, and means for actuating said mechanism and for controlling the direction and extent of the rotating movement including a pin wheel and a pair of disks provided with a plurality of pins for rotating the pin wheel.

4. An apparatus of the class described having, in combination, a light projector, mechanism for tipping and rotating the light projector, and means for actuating said mechanism and for controlling the direction and extent of the tipping and rotating movements including a pair of pin wheels and two pairs of disks provided with a plurality of pins for rotating the pin wheels.

5. An apparatus of the class described having, in combination, a spot-light, a casing therefor including a pair of trunnions; a turret in which the trunnions are journaled; a chain drive for tipping the spot-light on the turret, including a sprocket secured to one of the trunnions and a sprocket shaft journaled on the turret; a pinion mounted on the sprocket shaft, a cylindrical rack mounted to reciprocate on the turret and engage the pinion, and means for reciprocating the rack.

6. An apparatus of the class described having, in combination, a spot-light, a casing therefor including a pair of trunnions; a turret in which the trunnions are journaled; a chain drive for tipping the spot-light on the turret, including a sprocket secured to one of the trunnions and a sprocket shaft journaled on the turret; a pinion mounted on the sprocket shaft; a cylindrical rack mounted to reciprocate on the turret and engage the pinion, means for reciprocating the rack, and means for rotating the turret.

7. An apparatus of the class described having, in combination, a spot-light, mechanism for operating the spot-light to cause its stream of light to move through a predetermined cycle, a switch for a source of illumination independent of the spot-light including a lighting member, and means operating at the end of the spot-light cycle for actuating the lighting button.

8. An apparatus of the class described having, in combination, a spot-light, mechanism for operating the spot-light to cause its stream of light to move through a predetermined cycle, a switch for a source of illumination independent of the spot-light including a lighting member and a darkening member, and means operating between the spot-light cycles for successively actuating the lighting and darkening members.

9. An apparatus of the class described having, in combination, a spot-light, mechanism for operating the spot-light to cause its stream of light to move through a predetermined cycle including a pair of pin wheels and two pairs of disks provided with a plurality of pins for rotating the pin wheels, a switch for a source of illumination independent of the spot-light including a lighting and a darkening member, and a pin on one of the disks of each pair for pressing the lighting and darkening members successively between the spot-light cycles.

10. An apparatus of the class described having, in combination, a tippable and rotatable light projector, mechanism for tipping and rotating the light projector, and automatic means for controlling said mechanism to cause the stream of light to move through a predetermined path and spot successively a plurality of objects and hold the spot for an interval on at least one of said objects.

11. An apparatus of the class described having, in combination, a tippable and rotatable light projector, mechanism for tipping and rotating the light projector, automatic means for controlling said mechanism to cause the stream of light to move through a predetermined path and spot successively a plurality of objects, said controlling means including elements adjustable to change said path.

12. An apparatus of the class described having, in combination, a tippable and rotatable light projector, mechanism for tipping and rotating the light projector, automatic means for controlling said mechanism to cause the stream of light to move through a predetermined path and spot successively a plurality of objects and hold the spot for an interval on at least one of said objects, said controlling means including elements adjustable to vary said interval.

13. An apparatus of the class described having, in combination, a tippable and rotatable light projector, mechanism for tipping and rotating the light projector, automatic means for controlling said mechanism to cause the stream of light to move through a predetermined path and spot successively a plurality of objects and hold the spot for in interval on at least one of said objects, said controlling means including elements adjustable to change both the path and the interval.

14. An apparatus of the class described having, in combination, a tippable and rotatable light projector, mechanism for tipping and rotating the light projector, means for controlling said mechanism to cause the stream of light to move through a predetermined path and spot successively a plurality of objects and hold the spot for an interval on at least one of said objects, said controlling means including elements adjustable to vary the number of objects upon which the spot is held for an interval.

15. An apparatus of the class described having, in combination, a tippable and rotatable light projector, mechanism for tipping and rotating the light projector, means for controlling said mechanism to cause the stream of light to move through a predetermined path and spot successively a plurality of objects located in said path and hold the spot for an interval on at least one of said objects, said controlling means including elements adjustable to vary said interval and the number of objects upon which the spot is held for the interval.

16. An apparatus of the class described having, in combination, a spotlight, a casing therefor including a pair of trunnions, a turret in which the trunnions are journaled, means for tipping the spotlight on the turret including a cylindrical rack mounted to reciprocate in the turret, a pair of pinions engaged with the rack, one of which is a driving pinion and the other one of which is a driven pinion, and a pair of thrust pinions engaged by the rack.

17. An apparatus of the class described having, in combination, a spotlight, a casing therefor including a pair of trunnions, a turret in which the trunnions are journaled; a bevel gear secured to the turret, a tube secured to the bevel gear, a cap secured to the tube, said cap and bevel gear having central openings, a cylindrical chamber in which the tube and cap rotate, a thrust bearing interposed between the chamber and tube, means for rotating the bevel gear, and means for tipping the spotlight including a cylindrical rack mounted to reciprocate in the tube and through the openings in the bevel gear and cap.

18. An apparatus of the class described having, in combination, a light projector, mechanism for rotating the light projector, and means for actuating said mechanism for controlling the direction and extent of the rotating movement including a pin-wheel and rotary means provided with a plurality of pins for rotating said pin-wheel.

19. An apparatus of the class described having, in combination, a light projector, mechanism for tipping and rotating the light projector, and means for actuating said mechanism and for controlling the direction and extent of the tipping and rotating movement including a pair of pin-wheels and rotary means provided with a plurality of adjustable pins for rotating the pin-wheels.

HERBERT F. KING.